Figure 1:
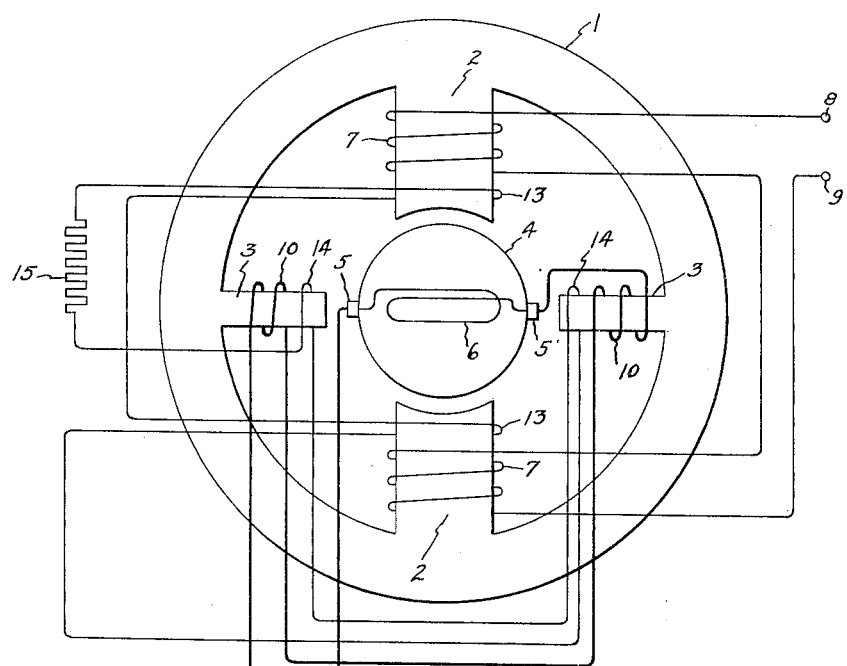

July 25, 1950  R. POHL  2,516,588

DYNAMOELECTRIC MACHINE COMMUTATION CONTROL MEANS

Filed April 20, 1948

Inventor:
Robert Pohl,
by Charell S Mack
His Attorney.

Patented July 25, 1950

2,516,588

UNITED STATES PATENT OFFICE 2,516,588

DYNAMOELECTRIC MACHINE COMMUTATION CONTROL MEANS

Robert Pohl, Birmingham, England, assignor to General Electric Company, a corporation of New York Application April 20, 1948, Serial No. 22,041
In Great Britain April 29, 1947

5 Claims. (Cl. 171—228)

1

This invention relates to commutator type dynamoelectric machines and more particularly to such machines which may have a transformer voltage developed in the armature coil undergoing commutation due to a change in the main field flux.

In commutator type dynamoelectric machines, there is a reactive voltage induced in the armature coil undergoing commutation due to the self-inductance of the short-circuited armature coil. Unless this reactive voltage is neutralized, brush sparking may result when the coil passes from under the brush. This reactive voltage is ordinarily neutralized by the use of interpole windings which produce a flux proportional to the armature current. This flux generates a speed voltage in the short-circuited armature coil which is in the proper direction to neutralize the reactive voltage. In addition to the reactive voltage induced in the armature coil undergoing commutation, as described above, a change in the main field flux caused by a change in the excitation of the machine will produce a transformer voltage in the short-circuited coil. Thus, commutator type machines in which rapid main field flux changes occur during operation, may be subject to commutator sparking, not only due to the reactive voltage, but also due to the transformer voltage. This transformer voltage while independent of the reactive voltage is additive thereto. Therefore, while the reactive voltage can be neutralized by the speed voltage produced by the interpole windings, it is also desirable to provide means for neutralizing the transformer voltage in commutator type machines subject to rapid changes in main field flux.

An object of this invention is to provide an improved commutator type dynamoelectric machine wherein the transformer voltage in the armature coil undergoing commutation due to a change in the main field flux is neutralized.

Further objects and advantages of this invention will become apparent and the invention will be better understood by reference to the accompanying drawing and description. The features of novelty which characterize this invention will be pointed out with particularity in the claims annexed to and forming part of this specification.

In accordance with this invention, the interpoles of the machine are excited responsive to the change in the main field flux thereby neutralizing the transformer voltage developed in the armature coils undergoing commutation, this excitation being in addition to their normal excitation by armature current for neutralization

2 of the reactive voltage. This additional interpole excitation, assuming constant speed of the machine and unsaturated interpoles, must be proportional to the rate of change of the main field flux. This excitation therefore, in the illustrated embodiment, is secured from a small additional winding on the main poles adapted to be acted upon by the main field flux, which winding is connected to an additional small winding on the interpole. The additional winding on the main poles has induced therein a transformer voltage proportional to the transformer voltage which appears in the short-circuited winding. This voltage is impressed upon the additional interpole winding and thus produces a component of interpole flux responsive to the change of main field flux. The resultant interpole flux generates a speed voltage which not only neutralizes the reactive voltage but also neutralizes the transformer voltage in the armature coil undergoing commutation. A phase shift must be provided so that the additional component of interpole flux will have the proper phase relationship to neutralize the transformer voltage. This phase shift may be secured by any means known to the art, for instance a resistance interposed between the additional main pole winding and the additional interpole winding.

Figure 3:
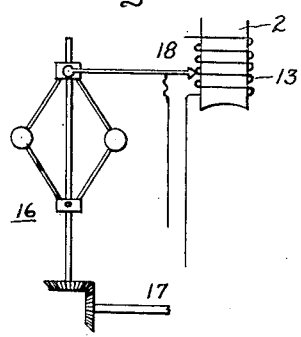
Figure 2:
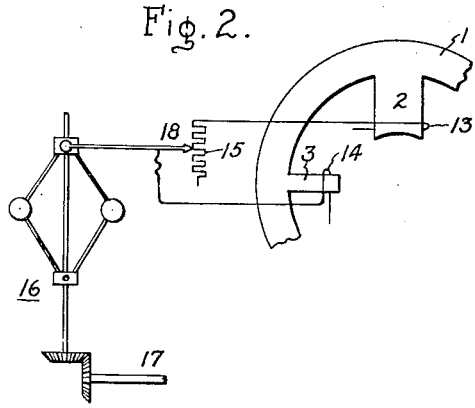

In the drawing, Fig. 1 illustrates schematically an embodiment of this invention applied to the commutator type dynamoelectric machine with separate shunt excitation; Fig. 2 illustrates another embodiment wherein the value of the resistance is varied responsive to speed in order to properly neutralize the transformer voltage; and Fig. 3 illustrates a further embodiment wherein the effective number of turns of the additional winding on the main polar projection is varied responsive to speed.

Referring to Fig. 1, there is shown a direct current motor with separate shunt excitation and having a stationary field structure including a yoke portion, a pair of main polar projections 2 and a pair of interpoles 3. The motor is provided with an armature, which may be of any desired type, with an associated commutator 4. The commutator is contacted by brushes 5 and one of the armature coils is shown at 6 in its short-circuited position while undergoing commutation. Main field exciting windings 7 are positioned on the main polar projections 2 and are adapted to be excited from an external source of voltage at terminals 8 and 9. Interpole windings 10 are positioned on the interpoles 3 and being arranged in series with the brushes 5 carry the armature current from load terminals 11 and 12. Since the interpole windings 10 carry the armature current, the interpole flux is proportional to the armature current and the speed voltage generated in the short-circuited armature coil 6 is in the proper direction to oppose and thus neutralize the voltage of self-induction or reactive voltage in the coil.

It can be readily seen that a sudden change in the excitation voltage across terminals 8 and 9 will produce a corresponding sudden change in the main field flux produced by the main field exciting windings 7. This sudden change in main field flux will induce a transformer voltage in the short-circuited armature coil 6 in addition to the reactive voltage produced by the self inductance of the coil. In order to substantially neutralize this transformer voltage to reduce commutator sparking attributable thereto, the arrangement now to be described is provided.

It will be readily apparent that in order to properly neutralize the transformer voltage in the coil 6 produced by a change in field excitation, a speed voltage substantially 180° in opposition thereto must be generated in the coil. To produce this speed voltage, an additional interpole winding 14 having an appropriate number of turns, shown here as a single turn, is positioned on the interpole 3 with the main interpole winding 10. The additional interpole winding 14 is energized responsive to a sudden change in the main field flux and, therefore, produces a component of interpole flux which generates the speed voltage in the coil 6 for neutralizing the transformer voltage. The excitation of the additional interpole winding 14 is provided by an additional winding 13 having an appropriate number of turns, shown here as a single turn, positioned on the main polar projections 2 together with the main field exciting winding 7. It can be readily seen, that since the additional winding 13 is acted upon by the main field flux produced by the main field exciting windings, this additional winding will have induced therein, due to a sudden change in the main field flux, a transformer voltage proportional to the transformer voltage produced in the short-circuited armature coil 6. The induced voltage in the winding 13, which is proportional to the transformer voltage in the coil 6, is impressed upon the additional interpole winding 14 and thus produces a component of interpole flux which is also proportional to the transformer voltage induced in the coil 6. It is further necessary to provide a 90° phase shift between the induced voltage in the additional winding 13 and the energizing voltage across the additional interpole winding 14 in order that the component of interpole flux produced thereby may be in the proper direction to neutralize the transformer voltage in the coil 6. Any one of the phase shifting means well known in the art may be employed for this purpose, however, I have shown, for the sake of simplicity, a resistor 15 interposed between the additional winding 13 and the additional interpole winding 14. A phase shift of approximately 90° of the transformer voltage induced in the winding 13 is secured by virtue of the resistor 15, the additional 90° phase shift being secured by the physical displacement 3, 90° from the main pole 2. Thus, the component of interpole flux produced by the additional interpole windings 14 is not only proportional to the transformer voltage induced in the circuited armature coil 6, but also has the proper phase relationship to generate a speed voltage in the coil to neutralize the transformer voltage. The resultant interpole flux has one component proportional to the armature current produced by the main interpole winding 10 and another component proportional to the transformer voltage in the coil 6 produced by the additional interpole winding 14, and therefore generates a speed voltage in the short-circuited armature coil 6 which not only neutralizes the reactive voltage therein but also neutralizes the transformer voltage induced in the coil due to a sudden change in excitation.

It will be readily seen that the resistor 15 not only provides the necessary phase shift between the transformer voltage in the winding 13 and the exciting current in the interpole winding 14, but also permits adjustment of the value of the additional excitation so as to permit quantitative neutralization of the transformer voltage in the short circuited armature coil. It will be readily apparent that any adjustment of the value of the additional excitation is correct only for a given speed since the transformer voltage is independent of the speed while the neutralizing speed voltage is proportional to the speed. Therefore, to permit this arrangment to be used on a machine subject to variations in speed as well as rapid changes in excitation, a centrifugal device can be provided for altering the value of the resistor 15 or for changing the effective number of turns in the winding 13 responsive to the speed.

Referring now to Fig. 2, in which like elements are indicated by like reference numerals, there is shown an embodiment of this invention wherein the value of the resistor 15 is altered responsive to the speed of the motor. Here, a centrifugal device 16 is operatively connected to the armature of the motor through shaft 17 and the centrifugal device is adapted to actuate a movable contact 18 on the resistor 15. Thus, as the speed of the machine increases, the amount of the resistance in circuit between the addiitional winding 13 and the additional interpole winding 14 will be increased, thereby increasing the IR drop across the resistance 15 and producing a corresponding decrease in the voltage across the additional interpole winding 14. As the speed of the machine increases, a smaller amount of additional interpole flux is necessary to produce the same speed voltage in the short-circuited armature coil 6 and this reduction in flux is produced by the increase in the value of the resistance 15. This arrangement, therefore, provides the requisite flux for neutralizing the transformer voltage through wide variations in the speed of the machine.

Referring now to Fig. 3, in which like elements are also indicated by like reference numerals, there is shown an arrangement similar to Fig. 2, except with means for varying the effective number of turns of the additional winding on the main polar projection 2 responsive to the speed. Here, the additional winding 13 is shown with a number of turns instead of a single turn as shown in Figs. 1 and 2. The centrifugal device 16 actuates a movable contact 18 which selects the effective number of turns of the winding 13 in response to the speed of the machine. Therefore, as the speed is increased the effective number of turns is decreased producing a corresponding decrease in the induced voltage in the winding 13. This, in turn, produces a corresponding decrease in the excitation voltage on the additional interpole winding 14 with a corresponding reduction in the additional interpole flux which, due to the increased speed, produces the same speed voltage in the short-circuited armature coil 6.

It will now be readily apparent that there is here provided a simple and effective means for securing neutralization of transformer voltage in the armature coils undergoing commutation due to sudden change in the excitation. Thus, it is possible to eliminate another cause of commutator sparking, therefore lengthening brush and commutator life and improving efficiency.

While there is illustrated and described a particular embodiment of this invention, further embodiments and modifications will occur to those skilled in the art. It is desired that it be understood, therefore, that this invention is not limited to the particular embodiment disclosed and it is intended in the appended claims to cover all modifications which do not depart from the spirit and scope of this invention.

What I claim as new and desire to secure by Letters Patent of the United States is:

1. In a commutator type dynamoelectric machine having an armature and a field structure with a main field exciting winding and an interpole winding energized responsive to the load current in said armature, another winding on said field structure adapted to be acted upon by the main field flux produced by said main field exciting winding for having induced therein a voltage responsive to a change in said main field flux, a second interpole winding adapted to be energized responsive to said voltage induced in said other winding for producing a component of interpole flux proportional to said change of main field flux, a resistor in circuit between said other winding and said second interpole winding for producing a phase shift between said voltage induced in said other winding and the energizing voltage across said second interpole winding whereby said component of interpole flux produced by said second interpole winding has the proper phase relationship to neutralize the transformer voltage induced in the armature coil undergoing commutation by said change in said main field flux, and means for altering the value of said resistance responsive to the speed of said machine whereby said transformer voltage is properly neutralized at all speeds.

2. In a commutator type dynamoelectric machine having an armature and a field structure with a main field exciting winding and an interpole winding energized responsive to the load current in said armature, another winding on said field structure having a smaller number of turns than said main field exciting winding and adapted to be acted upon by the main field flux produced by said main field exciting winding for having induced therein a voltage responsive to a change in said main field flux, a second interpole winding having a smaller number of turns than said first-mentioned interpole winding and adapted to be energized responsive to said voltage induced in said other winding for producing a component of interpole flux proportional to said change of main field flux, a resistor in circuit between said other winding and said second interpole winding for producing a phase shift between said voltage induced in said other winding and the energizing voltage across said second interpole winding whereby said component of interpole flux produced by said second interpole winding has the proper phase relationship to neutralize the transformer voltage induced in the armature coil undergoing commutation by said change in said main field flux, and means for altering the value of said resistance responsive to the speed of said machine whereby said transformer voltage is properly neutralized at all speeds.

3. In a commutator type dynamoelectric machine having an armature and a field structure including a pair of main polar projections and an interpole with a main field exciting winding positioned on said main polar projections and an interpole winding positioned on said interpole energized responsive to the load current in said armature, another winding on said main polar projections adapted to be acted upon by the main field flux produced by said main field exciting winding for having induced therein a voltage responsive to a change in said main field flux, a second interpole winding on said interpole adapted to be energized responsive to said voltage induced in said other winding for producing a component of interpole flux proportional to said change of main field flux, a resistor in circuit between said other winding and said second interpole winding for producing a phase shift between said voltage induced in said other winding and the energizing voltage across said second interpole winding whereby said component of interpole flux produced by said second interpole winding has the proper phase relationship to neutralize the transformer voltage induced in the armature coil undergoing commutation by said change in said main field flux, and means for altering the value of said resistance responsive to the speed of said machine whereby said transformer voltage is properly neutralized at all speeds.

4. In a commutator type dynamoelectric machine having an armature and a field structure with a main field exciting winding and an interpole winding energized responsive to the load current in said armature, another winding on said field structure adapted to be acted upon by the main field flux produced by said main field exciting winding for having induced therein a voltage in response to a change in said main field flux, a second interpole winding adapted to be energized responsive to said voltage induced in said other winding for producing a component of interpole flux proportional to said change of main field flux whereby the transformer voltage induced in the armature coil undergoing commutation by said change of said main field flux is neutralized, and means for altering the effective number of turns of said other winding responsive to the speed of said machine whereby said transformer voltage is properly neutralized at all speeds.

5. In a commutator type dynamoelectric machine having an armature and a field structure with a main field exciting winding and an interpole winding energized responsive to the load current in said armature, another winding on said field structure adapted to be acted upon by the main field flux produced by said main field exciting winding for having induced therein a voltage responsive to a change in said main field flux, a second interpole winding adapted to be energized responsive to said voltage induced in said other winding for producing a component of interpole flux proportional to said change of main field flux, a resistor in circuit between said other winding and said second interpole winding for producing a phase shift between said voltage induced in said other winding and the energizing voltage across said second interpole winding whereby said component of interpole flux produced by said second interpole winding has the proper phase relationship to neutralize the transformer voltage induced in the armature coil undergoing commutation by said change in said main field flux, and means for altering the effective number of turns of said other winding responsive to the speed of said machine whereby said transformer voltage is properly neutralized at all speeds.

ROBERT POHL.

REFERENCES CITED

The following references are of record in the file of this patent:

UNITED STATES PATENTS

| Number | Name | Date |
| --- | --- | --- |
| 399,402 | Higham | Mar. 12, 1889 |
| 1,293,764 | Hall | Feb. 11, 1919 |
| 1,677,699 | Alexanderson | July 17, 1928 |

FOREIGN PATENTS

| Number | Country | Date |
| --- | --- | --- |
| 695,642 | France | Oct. 6, 1930 |
| 304,703 | Germany | Mar. 27, 1918 |